June 25, 1957 — M. S. WELLS — 2,796,673
APPARATUS FOR TESTING FOR PARALLELISM OF CONNECTING ROD JOURNALS
Filed Dec. 14, 1956
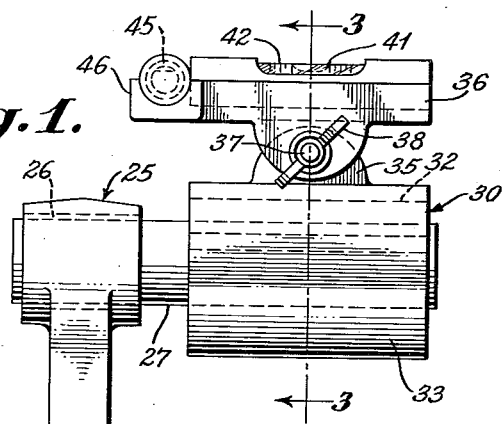
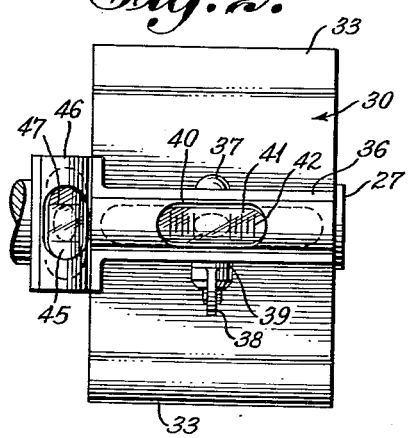
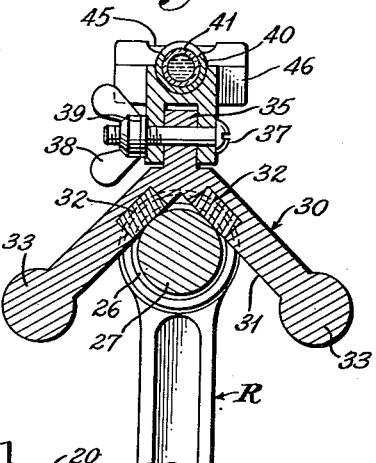
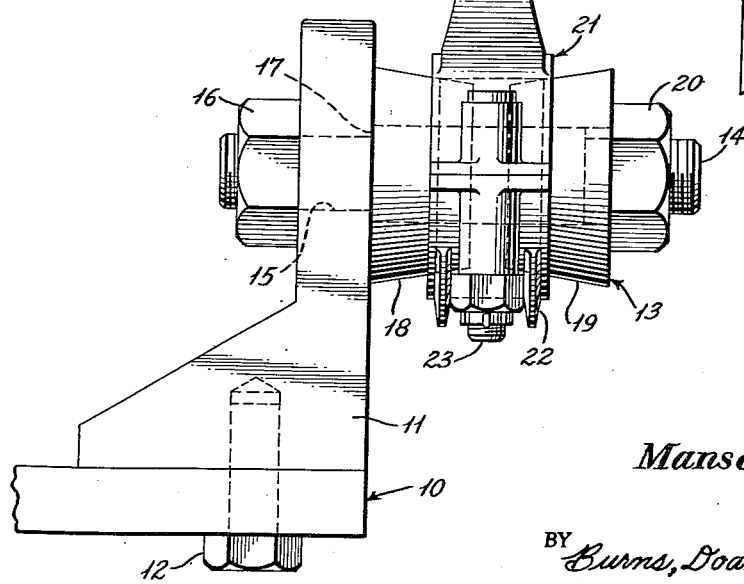
INVENTOR
Mansel S. Wells
BY Burns, Doane, Benedict & Irons
ATTORNEYS

United States Patent Office 2,796,673
Patented June 25, 1957

2,796,673

APPARATUS FOR TESTING FOR PARALLELISM OF CONNECTING ROD JOURNALS

Mansel S. Wells, Smethport, Pa.

Application December 14, 1956, Serial No. 628,398

8 Claims. (Cl. 33—180)

This invention relates generally to the testing of the alignment and correcting for misalignment of the journal axes of internal combustion engine connecting rods. More specifically, such invention is directed to an apparatus to enable accurate testing of the alignment or parallelism of the journal axes of connecting rods and straightening of the connecting rod while it is mounted in the apparatus.

In the repair and rebuilding of internal combustion engines, such as automobile, truck and tractor engines, it is particularly important that the connecting rods employed in such engines have the crank shaft journal axis and the wrist pin journal axis disposed in parallel alignment. Misalignment of these two journal axes in only one of the connecting rods employed in a rebuilt or repaired engine can have the effect of ruining or at least materially diminishing the satisfactory operation and life of the engine subsequent to its repair or rebuilding.

Structures have been provided in the past and are presently available for use in checking the alignment or parallelism of the journal axes of connecting rods. Such presently available structures are complicated, do not enable straightening or correction for misalignment while the device is mounted on the testing machine, and, because of their complexity, require the time of skilled mechanics in carrying out the testing and straightening of the connecting rods if the final product is to have any degree of accuracy.

The deficiencies in the presently available structures for the checking of the alignment of connecting rod journal axes have resulted in the development of the hereinafter described invention which overcomes the above noted drawbacks to prior structures in providing a simple, inexpensive apparatus which may be employed by relatively unskilled workers to provide foolproof checking of the alignment of connecting rod journal axes and straightening of such connecting rods to correct for any twist or bend which may be existent in the length of the rod intermediate the crank shaft journal and the wrist pin journal. The hereinafter described invention is ideally suited for mass production operation so that the checking and correcting for any misalignment in connecting rods may be expeditiously carried out with complete accuracy in the resultant product. Further, the apparatus of this invention may be simply checked for its own accuracy from time to time to verify the continued accuracy of testing the connecting rods which are being checked on the apparatus.

It is a principal object of this invention to provide an improved apparatus for testing the alignment or parallelism of connecting rod journal axes with utmost speed and accuracy, which apparatus is relatively inexpensive and compact for ease of handling and transportation from one point of use to another.

It is a further object of this invention to provide an apparatus for the testing of alignment and correction of any misalignment in the journal axes of a connecting rod while such rod is mounted in the apparatus.

It is also an object of this invention to provide a simple and compact testing gauge for checking the alignment of connecting rod journal axes where such gauge is constructed to be retained on the wrist pin of the connecting rod being checked in an upright position.

It is an additional object of this invention to provide a gauge for checking the alignment of connecting rod journal axes where such gauge is supported on the wrist pin of the connecting rod being checked and the gauge has means permitting checking of the positioning of the gauge in an upright position.

The above and more specific objects of the instant invention will be apparent by reference to the description of a specific embodiment of the invention as shown on the drawing, which is merely illustrative of a structure embodying the features of the invention and in which:

Figure 1 is a side elevational view showing the apparatus with a connecting rod mounted for testing the alignment or parallelism of the journal axes;

Figure 2 is a plan view of the gauge device mounted on a wrist pin as shown in Figure 1; and Figure 3 is a sectional view taken on line 3—3 of Figure 1.

Referring to the drawing, and more specifically to Figure 1 thereon, reference numeral 10 designates the edge of a suitable supporting table onto which the apparatus of the instant invention may be secured. A supporting base 11 is bolted onto the table by bolts 12. A mandrel 13 extends laterally outwardly from the supporting base 11 to provide a means for rotatably mounting the crank shaft journal 21 of the connecting rod R to be tested, with such mandrel permitting the connecting rod to be swung about its crank shaft journal to different positions for effecting the desired testing of the connecting rod for twist and/or bend in the rod intermediate its crank shaft journal 21 and wrist pin journal 25.

Mandrel 13, as shown on the drawing, includes a stud 14 threaded at both ends, with one end extending through a bore 15 in supporting base 11 and a nut 16 engaged with such one end to fasten the stud on the supporting base. A shoulder 17 is provided on stud 14 to limit movement of the end of the stud through bore 15 so that the nut 16 may rigidly fasten the stud onto the support 11.

A pair of conical rings 18 and 19 are slidably received over the mid portion of stud 14 with the enlarged end of ring 18 engaging the side of supporting base 11. A nut 20 is threaded onto the outer end of stud 14 and engages with ring 19 so that the threading of nut 20 onto the end of stud 14 will effect movement of ring 19 toward ring 18.

A connecting rod R is shown positioned on the apparatus with its crank shaft journal 21 engaged with and mounted on the mandrel 13. The crank shaft journal, as is conventional in connecting rod constructions, is formed with one half thereof integral with the main body of the connecting rod and bearing cap 22 forming the other half of the journal. The cap is bolted onto the body of the connecting rod by bolts 23 which connect the opposite sides of the bearing cap to the body of the connecting rod.

It will be readily recognized that as nut 20 is threaded onto stud 14 the conical rings 18 and 19 will be moved toward one another and engage the interior of the crank shaft journal of the connecting rod adjacent the ends of such journal. Thus, the connecting rod is mounted on supporting base 11 to be swung about mandrel 13 by reason of the mounting structure provided therefor. It will be appreciated that the specific construction of mandrel 13 as shown on Figure 1 of the drawing is only for purposes of illustration and that within the scope of the instant invention a variety of connecting rod supporting constructions may be employed. Thus, for example, an expansible mandrel may be provided to permit rotatable mounting of the connecting rod for testing of the alignment between its crank shaft journal and wrist pin journal.

As shown in Figure 1 the connecting rod R extends upwardly from mandrel 13 and supporting base 11 so that its wrist pin journal 25, having a sleeve bushing 26 mounted therein, is disposed vertically above the mandrel. A wrist pin 27 is shown positioned within bushing 26 to extend laterally outwardly therefrom and provide a reference base for supporting the gauge device used in testing the parallelism between the wrist pin journal axis and the crank shaft journal axis.

The gauge device includes a gauge body 30 having an elongated V-shaped groove 31 extending along the underside thereof. As shown more clearly in Figure 3, a pair of magnets 32 are embedded in the faces of the groove 31 to assist in retaining the device on the wrist pin. It will be appreciated, however, that, if desired, the gauge body 30 may itself be magnetized to perform the same function without the necessity of providing the separate magnets 32 embedded in such gauge body or where not needed the magnet retaining action omitted in constructing the gauge. A pair of counterweights 33 are provided along the lowermost edge of gauge body 30 and are disposed, as is apparent from the drawing on Figure 3, at a distance below the point of contact of groove 31 with wrist pin 27 so that such weights assist in retaining the device in an upright position on the wrist pin during the testing operation.

The upper side of gauge body 30 has an upstanding lug 35 which engages with the underside of a holder 36. A bolt 37 extends through aligned apertures in lug 35 and holder 36 and is provided with a wing nut 38 and a washer 39 to facilitate rigidly securing holder 36 on lug 35 and thereby on gauge body 30. As is apparent from the showing on the drawing, wing nut 38 may be loosened to permit rocking of holder 36 about lug 35 so that such holder may be adjusted relative to the gauge body 30.

Holder 36 has an elongated pocket 40 which receives a liquid level vial 41. The mid portion of the length of vial 41 is exposed through the open top of pocket 40 and is graduated at 42 so that the movement of the air bubble within the vial and its position relative to the graduations 42 may be employed to indicate the extent of misalignment of the connecting rod journal axes in a manner as will be apparent from the description hereinbelow. It will be noted that the axis of level vial 41 is disposed in a plane common to the longitudinal axis of V-shaped groove 31. Further, by loosening wing nut 38, the position of the axis of vial 41 relative to the longitudinal axis of groove 31 may be varied within such common plane. After the desired adjustment has been made, wing nut 38 is tightened on bolt 37 to secure the position of holder 36 and vial 41 in the desired location relative to gauge body 30.

In the illustrated embodiment a second liquid level vial 45 is supported in a carrier 46 disposed at one end of holder 36. Liquid level vial 45 as mounted in carrier 46 is positioned with its longitudinal axis disposed generally normal to the plane common to the longitudinal axis of V-shaped groove 31 and axis of liquid level vial 41. Vial 45 has graduations 47 so that movement of the air bubble within the vial and its position relative to the graduations 47 may be employed to indicate the position of the gauge device relative to the vertical. Liquid level vial 45 is thus utilized to check and assure that the gauge device is disposed on the wrist pin in a proper upright position as, for example, shown in Figures 2 and 3 as a preliminary check prior to the reading and utilization of the information conveyed by the position of the bubble relative to graduations 42 of vial 41. It will be readily recognized that although as specifically illustrated the liquid level vial 45 is carried by holder 36 this vial could appropriately be mounted on body 30 in a position to enable appropriate checking of the upright position of the gauge device when it is mounted on the wrist pin.

Reference will now be had to the steps employed in utilization of the hereinabove described apparatus for the checking of the alignment of the journal axes of a connecting rod. As the initial step, the connecting rod R to be tested is mounted on mandrel 13 so that such mandrel, on supporting base 11, will serve to hold the connecting rod during the testing operation. The wrist pin 27 is engaged with the sleeve bushing in the wrist pin journal for the testing and straightening operation and the connecting rod swung to extend horizontally from the mandrel 13. In this position, the gauge device is supportingly engaged with the wrist pin 27 so that vial 41 faces upwardly to enable reading of the position of the air bubble relative to graduations 42. In positioning the gauge device on the wrist pin the air bubble in vial 45 will be centered relative to graduations 47 to assure that the device is in a proper upright relation so that the reading of vial 41 may be assured to be accurate.

At the outset it is necessary that the gauge device be adjusted in accordance with the particular position of the mandrel 13 with which it is to be used. It may be pointed out that the apparatus of the instant invention may be employed in checking the alignment of the connection rod journals irrespective of the fact that mandrel 13 is not perfectly horizontal. Thus, if mandrel 13 carried on supporting base 11 is secured to a surface such that the mandrel is at a slight incline, it will not prevent accurate testing of connecting rods with the apparatus once the gauge device has been adjusted for use with the particular position of the mandrel.

To perform the calibrating or adjusting of the gauge device for use with the particular mandrel, the position of the level bubble of vial 41 when the connecting rod extends horizontally from the mandrel 13 will be noted. Thereafter the connecting rod is swung through an arc of 180° so as to extend horizontally from the opposite side of the mandrel 13. The gauge device in this second position will be disposed with the vial 41 facing upwardly and again the position of the level bubble relative to graduations 42 will be noted. As mentioned above, checking for accurate upright positioning of the gauge device may be made by reference to the bubble in liquid level vial 45 relative to graduations 47.

The wing nut 38 is then loosened to permit adjustment of holder 36 relative to the gauge body 30 so that in both of the above mentioned horizontal positions of the connecting rod the level bubble will be disposed at the center of graduations 42. If the connecting rod mounted on mandrel 13 has a twist in its length so that in effect the wrist pin axis does not lie in the same plane as the crank shaft journal axis, the reading of the level bubble will depart from its central position for an equal distance on opposite sides of the center point in the two above noted horizontal positions of the connecting rod. Accordingly the accurate adjustment of the gauge device may be obtained by positioning holder 36 relative to gauge body 30 so that in the two horizontal positions of the connecting rod the air bubble assumes its center position within vial 41 or takes positions removed an equal number of graduations on opposite sides of the center position at the two horizontal connecting rod positions respectively.

The latter condition indicates that the particular connecting rod being tested possesses a twist in its length. To correct for this twist, a bar is inserted into the wrist pin 27 and pressure applied to the end thereof to apply a torque to the length of the connecting rod R to correct for the twist present in such rod. Once the twist has been corrected and the gauge device properly adjusted for the particular mandrel with which it is to be used, the level bubble will assume a central position in the vial 41 when the connecting rod is disposed at each of the two horizontal positions. The wing nut is then tightened to lock the holder 36 relative to gauge body 30 so that the device is accurately set for use with the particular mandrel. In reading the bubble location in vial 41 for each position the location of the bubble in vial 45 may be noted to check that the gauge device is properly upright at the time of each reading.

To check for the existence of bend in the length of the connecting rod R, which would mean that the wrist pin journal axis and the crank shaft journal axis, while disposed in the same plane, are not truly parallel within such plane, the connecting rod is swung to the vertical position such as shown in Figure 1 of the drawing. The gauge device has previously been set or calibrated for the position of mandrel 13 and, therefore, any bend in the length of the connecting rod will result in the level bubble being disposed away from the central position within the level vial 41. To correct for bend as may be indicated by the level bubble being disposed away from the center of graduations 42, a bar is inserted into wrist pin 27 and force applied thereto in a direction to bend the connecting rod in a direction such as to return the level bubble to central position within the vial. When the bend has been properly corrected by manipulation of the bar inserted into the wrist pin 27, the level bubble will assume a position at the center of graduations 42.

Once the gauge device has been adjusted or calibrated for the particular mounting of the mandrel with which it is to be used, it is ordinarily not necessary that further adjustments to the gauge device be made, although the accuracy of the adjustment may be readily checked at any time when a connecting rod is mounted on the mandrel for the checking of the alignment of its journal axes. After the adjustment of the gauge device has been made and locked in position by wing nut 38 and bolt 37, on each succeeding connecting rod checked by the apparatus it is merely necessary to swing the connecting rod with such rod mounted on mandrel 13 between the vertical position and one horizontal position. The position of the level bubble in vial 41 with the gauge device supportingly engaged with the wrist pin when the connecting rod is in the vertical position will be indicative of the existence of any bend present in the particular connecting rod being tested. Similarly, with the connecting rod in the horizontal position, the location of the level bubble relative to graduations 42 indicates the amount of twist, if any, present in the particular connecting rod being tested. While the connecting rod is mounted on mandrel 13, a bar may be inserted into the wrist pin 27 to apply a force in the proper direction to correct for bend and/or twist of the connecting rod as evidenced by the level bubble not being at the central position when the rod extends vertically and horizontally, respectively.

It is particularly important to note that all corrections for bend or twist of a connecting rod being tested may be made while the rod is mounted on the mandrel and while the gauge device is positioned to provide a continuous indication of the degree of bend or twist which much be corrected. The construction of the gauge device incorporating magnet means for holding it on the wrist pin and the counterweights tending to retain it in an upright position contributes to the advantageous features of the instant invention in that the gauge device will remain properly positioned on the wrist pin while the force is applied to correct the bend or twist without the necessity of the operator holding such device in position. Thus the operator has both hands free to apply the necessary force to correct for misalignment of the journal axes of the connecting rod. Further, the provision of the second level vial 45 permits the operator to accurately position the gauge device upright on the wrist pin while each reading of level vial 41 is being made.

Once the gauge device has been adjusted and locked in position further adjustment of such device is not necessary. However, from time to time as the connecting rods are being tested on the apparatus the accuracy of the adjustment of the gauge may be checked by merely swinging the particular connecting rod being tested between the two horizontal positions to insure that with the rod straightened the level bubble remains centrally of graduations 42 at both horizontal positions.

This application is a continuation-in-part of my co-pending application Serial Number 518,314, filed June 27, 1955, and now abandoned.

Having thus described my invention, what I claim is:

1. Apparatus for testing the alignment of the journal axes of connecting rods comprising a supporting base having a mandrel extending laterally outwardly therefrom with means for rotatably mounting the crank shaft journal of the connecting rod being tested to be swingable about said mandrel with the wrist pin axis generally parallel to the axis of said mandrel, a gauge body having an elongated generally V-shaped groove extending along the lower side thereof to supportingly engage with the wrist pin of the connecting rod mounted on said mandrel, a holder provided with an elongated pocket having its axis disposed in a plane common to the axis of said groove, a liquid level vial positioned in said pocket, and mounting means attaching said holder to the upper side of said body and including means enabling selective adjustment within said common plane of the position of the axis of said pocket relative to the axis of said groove.

2. Apparatus for testing the alignment of the journal axes of connecting rods as recited in claim 1, further comprising a second liquid level vial carried by said holder with its longitudinal axis generally normal to said plane.

3. Apparatus for testing the alignment of the journal axes of connecting rods comprising a supporting base having a laterally extending mandrel for rotatably mounting the crank shaft journal of the connecting rod being tested with the wrist pin axis generally parallel to the axis of said mandrel, a gauge body having a generally V-shaped groove extending longitudinally along the lower side thereof to supportingly engage with the wrist pin of the connecting rod mounted on said mandrel and counterweight means disposed on the sides of said groove to lower the center of gravity of said body, and a holder carrying a liquid level vial mounted on the upperside of said body with the axis thereof and the longitudinal axis of said groove disposed in a common plane, the mounting for said holder permitting limited movement within said common plane of the axis of said vial relative to the longitudinal axis of said groove.

4. A device for testing the alignment of the journal axes of connecting rods comprising a gauge body having an elongated generally V-shaped groove along the lowerside thereof to supportingly engage with the wrist pin of the connecting rod being tested and an upstanding member carried on the upperside thereof, counterweight means extending downwardly on opposite sides of said groove to lower the center of gravity of said body so that it will be retained in an upright position on the wrist pin, a holder connected to said upstanding member to be adjustable relative to said body about an axis generally perpendicular to the longitudinal axis of said groove and having an elongated pocket positioned with its axis in a plane common to the axis of said elongated groove, and a liquid level vial secured in said pocket.

5. A device for testing the alignment of the journals of connecting rods as recited in claim 4, further comprising a second liquid level vial carried by said device with its longitudinal axis generally normal to said plane.

6. A device for testing the alignment of the journal axes of connecting rods comprising a gauge body having an elongated generally V-shaped groove along the lowerside thereof to supportingly engage with the wrist pin of the connecting rod being tested and an upstanding member carried on the upperside thereof, magnets embedded in the faces of said groove, counterweight means extending downwardly on opposite sides of said groove to lower the center of gravity of said body so that it will be retained in an upright position on the wrist pin, a holder connected to said upstanding member to be adjustable relative to said body about an axis generally perpendicular to the longitudinal axis of said groove and having an elongated pocket positioned with its axis in a plane common to the axis of said elongated groove, and a liquid level vial secured in said pocket.

7. A device for testing the alignment of the journal axes of connecting rods comprising a gauge body having an elongated generally V-shaped groove along the lowerside thereof to supportingly engage with the wrist pin of the connecting rod being tested, said body having magnetic attraction means to facilitate retention of said body on the wrist pin, a holder provided with an elongated pocket having its axis disposed in a plane common to the axis of said groove, a liquid level vial positioned in said pocket, and mounting means attaching said holder to the upperside of said body and including means enabling selective adjustment within said common plane of the position of the axis of said pocket relative to the axis of said groove.

8. A device for testing the alignment of the journal axes of connecting rods comprising a gauge body having an elongated generally V-shaped groove along the lowerside thereof to supportingly engage with the wrist pin of the connecting rod being tested and an upstanding member carried on the upperside thereof, a holder connected to said upstanding member to be adjustable relative to said body about an axis generally perpendicular to the longitudinal axis of said groove and having an elongated pocket positioned with its axis in a plane common to the axis of said groove, a liquid level vial secured in said pocket, and a second liquid level vial mounted on said device with its longitudinal axis generally normal to said plane.

References Cited in the file of this patent

UNITED STATES PATENTS

| | | |
|---|---|---|
| 521,306 | Campbell | June 12, 1894 |
| 1,406,262 | Kronert | Feb. 14, 1922 |
| 1,554,610 | Webster | Sept. 22, 1925 |
| 1,610,193 | Battle | Dec. 7, 1926 |
| 2,572,999 | Elliott | Oct. 30, 1951 |
| 2,611,187 | Keene et al. | Sept. 23, 1952 |

FOREIGN PATENTS

| | | |
|---|---|---|
| 405,408 | Great Britain | Feb. 8, 1934 |